No. 735,138. PATENTED AUG. 4, 1903.
J. M. NORMAND.
TOOL HOLDER.
APPLICATION FILED JAN. 13, 1902.
NO MODEL.
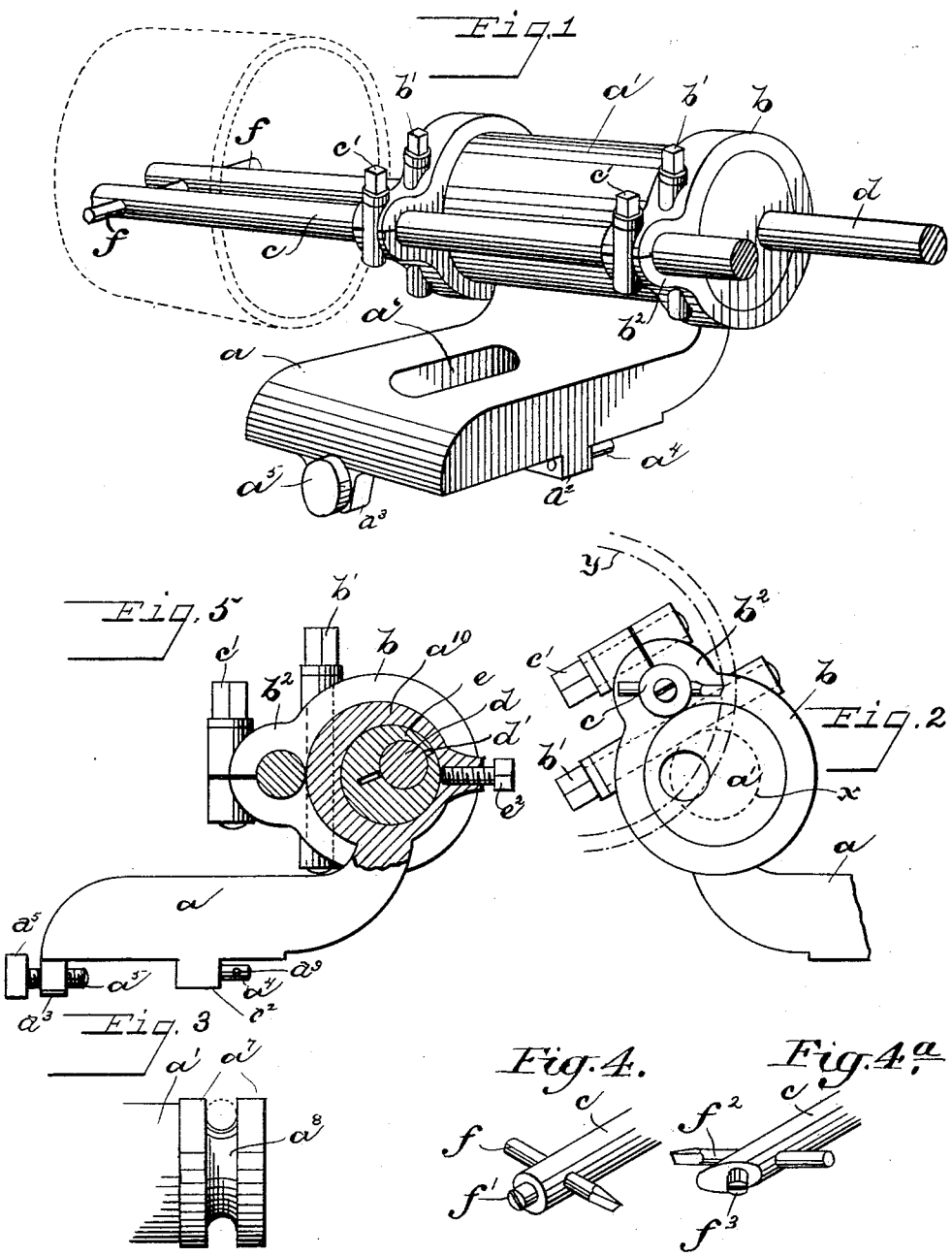

No. 735,138. Patented August 4, 1903.

UNITED STATES PATENT OFFICE.

JOSEPH M. NORMAND, OF SPRINGFIELD, OHIO, ASSIGNOR TO THE UNITED STATES TOOL HOLDER COMPANY, OF SPRINGFIELD, OHIO, A CORPORATION OF OHIO.

TOOL-HOLDER.

SPECIFICATION forming part of Letters Patent No. 735,138, dated August 4, 1903.

Application filed January 13, 1902. Serial No. 89,621. (No model.)

*To all whom it may concern:*

Be it known that I, JOSEPH M. NORMAND, a citizen of the United States, residing at Springfield, in the county of Clark and State of Ohio, have invented certain new and useful Improvements in Tool-Holders, of which the following is a specification.

My invention relates to tool-holders, and more especially to tool-holders carrying boring and turning bars.

The varied forms of turning and boring and the many kinds of material upon which the work is done not only demand a great variety of tools to meet the conditions, but also require a varied and nice adjustment and a rigid holding of the tool to the work.

The object of my invention is to provide a holder carrying a boring and turning bar capable of vertical adjustment, also a secondary bar which may be used for boring while the other is employed in turning. I attain these objects by the constructions and combinations hereinafter more fully described, and set forth in the accompanying drawings, in which—

Figure 1 is a perspective view of a holder embodying my device. Fig. 2 is an end view showing the cutter of the boring and turning bar in position for boring. Fig. 3 is a detail showing groove in barrel. Fig. 4 and Fig. 4$^a$ show two ways of mounting the cutters; and Fig. 5 is an end view, partly in section, showing a modification making the secondary bar vertically adjustable.

Like parts are represented by similar letters of reference in the several views.

In the drawings, $a$ is the shank, having the horizontal barrel-head $a'$ formed at right angles thereto. The shank is provided on its base with the projections $a^2$ and $a^3$, having the set-screws $a^4$ and $a^5$ to accurately adjust the holder on the slide-rest of a lathe or other turning or boring machine, and the slot $a^6$ allows the tool-post to extend through the shank to attach the holder to the rest. The tool-holding slots in slide-rests of lathes and like machines vary in width, and it has been necessary to make the projections on the tool-holders the same width as the slot. It follows that in ordering a tool-holder the width of the slot must be given; but this is rarely done, making it necessary in nearly all cases for the manufacturer to inquire for the width of the slot in the slide-rest. This is not only an inconvenience and annoyance, but prevents the completion of the tool-holders in quantities—a material point in these days of great competition and close prices, where the profit is largely in being able to manufacture goods in quantities. I overcome these difficulties and am able to complete my tool-holders in large quantities to meet the varying width of slots in the slide-rests by giving the projection $a^2$ a width independent of the size of the slots and of less width than the slots and by providing the projections with set-screws $a^4$ (one of which is at the other end of the projection and not shown) to be tightened against the inside walls of the slot, and thereby tighten the projection in the slot. The set-screws $a^4$ may be operated by inserting a rod or spindle in the perforation $a^9$ of its head, and the tightening of the projection $a^2$ in the slot brings the tool in alinement with the axes of the machine. A projection $a^3$, with a set-screw $a^5$, may be used as additional means to further tighten the shank or body to the slide-rest. The head $a'$ is provided at its respective ends with the bearings $a^7$ to carry the split collars $b$, which are tightened thereon by the screws $b'$, said bearings $a^7$ having the grooves $a^8$ to permit the passage of the screws $b'$, and thereby prevent lateral movement of the collars on said bearings.

The collars $b$ are formed with the lateral extensions $b^2$, having bearings therein to carry the boring and turning bar $c^2$, and the screws $c'$, together with the screws $b'$, form the means of rigidly clamping the bar in place.

Within the barrel $a'$, and preferably at one side of its axial center and opposite the shank, I form a bearing to carry a secondary cutter $d$ in a line parallel with the bar $c$, and when both bars are employed the bar $c$ becomes the turning-bar, as shown in Fig. 1. The cutter-bar $d$ is fixed in position by a set-screw (not shown) extending through the wall of the barrel and impinging on said bar.

In Fig. 5 I have shown a modification whereby the bar $d$ is given a vertical adjustment. This is accomplished by employing the barrel $e$ within the barrel $a^{10}$, placing it to one side of the axial center of $a^{10}$ to avoid the grooves $a^8$, as shown in Fig. 3. Within the barrel $e$, at one side of its axial center, I place the bar $d$, and it is clamped in place by having the barrel $e$ split at $d'$, so that the set-screws $e^3$, bearing upon it, will clamp the bar. When the barrel $e$ is not employed, the set-screws $e^2$ bear directly on the bar $d$ to fix its position.

While I have shown the cutter-bars $c$ and $d$ in Fig. 1 with cutters $f$ in only one end of said bars, it is obvious that the other ends may be provided with cutters, and for convenience in adapting my device for various classes of work I may use bars cut off at right angles at one end, the cutters $f$ being held in transverse perforations near said end by the set-screws $f'$, as shown in Fig. 4, and the other ends of said bars may be beveled, the cutters $f^2$ being held in perforations near to and preferably at the same angle with the bevel of said ends by the set-screws $f^3$, as shown in Fig. 4$^a$. It will be seen that by reversing the bars either cutter may be used as desired, thus making a convenient and ready arrangement.

Fig. 2 shows the bar $c$ with its cutter in position for boring, the bar $d$ being removed, the dotted line $x$ representing the base of the grooves $a^8$, and the dot-and-dash lines $y$ the cylinder to be bored.

It will be seen that in addition to the longitudinal and transverse movement of the usual slide-rest I provide for the vertical adjustment of the cutter. The boring and turning bar $c$ being in place and the screws $b'$ and $c'$ loose, the split collars $b$ can be turned upon their bearings to adjust the height of the bar and cutter, and when so adjusted the screws $b'$ and $c'$ are tightened to hold the bar rigidly in its adjusted position, and by the use of the modification shown in Fig. 5 the height of the bar $d$ and its cutter can be adjusted by turning the barrel $e$, which is tightened in its adjusted position by the set-screws $e^2$.

Having thus described my invention, I claim—

1. The combination with the shank having a head at an angle thereto, with circular bearings on the respective ends of said head, of a cutter-bar and supports for said bar journaled on each of said bearings, whereby said supports may be turned on said bearings, and means to tighten said supports on said bearings, substantially as specified.

2. The combination with the shank having a transversely-extending head with circular bearings on the respective ends of said head, of a cutter-bar and supports for said bar journaled on each of said bearings, whereby said supports may be turned on said bearings, means to tighten said bar in said supports, and means to tighten said supports in their adjusted position on said bearings, substantially as specified.

3. The combination with the shank having a transversely-extending head with circular bearings having grooves thereon, on the respective ends of said head, of a cutter-bar and split collars having extensions adapted to carry said bar, said collars being journaled on the bearings of said head, screws in said collars extending through said grooves to tighten said collars on the head, and screws in said extension to tighten the bar in said collars, substantially as specified.

4. The combination with the head carrying a cutter-bar, said head having circular bearings thereon, of supports carrying another cutter-bar mounted on said bearings, whereby said last-named bar may be adjusted in its relation to said first-named bar and to the work, means to tighten said bars in place, and means to tighten said supports in their adjusted positions, substantially as specified.

5. The combination with the head and a cutter-bar adjustably mounted therein, said head having circular bearings thereon, of supports carrying another cutter-bar mounted on said bearings, whereby said bars may be adjusted in their relation to each other and to the work, and means to tighten said bars in their adjusted positions, substantially as specified.

6. The combination with the head having a round, split head mounted therein carrying a cutter-bar at one side of its axis, said first-named head having circular bearings thereon, of split collars carrying another cutter-bar mounted on said bearings, whereby said bars may be adjusted in their relation to each other and to the work, and screws in said collars and head to tighten said bars in their adjusted positions, substantially as specified.

In testimony whereof I have hereunto set my hand this 28th day of December, A. D. 1901.

JOSEPH M. NORMAND.

Witnesses:
PERCY NORTON,
CHAS. I. WELCH.